US007117821B2

(12) United States Patent
Novak

(10) Patent No.: US 7,117,821 B2
(45) Date of Patent: Oct. 10, 2006

(54) CAT SCRATCHING APPARATUS

(75) Inventor: Frank Novak, Los Angeles, CA (US)

(73) Assignee: Modernica, Inc., Los Angeles, CA (US)

( * ) Notice: Subject to any disclaimer, the term of this patent is extended or adjusted under 35 U.S.C. 154(b) by 0 days.

(21) Appl. No.: 11/219,456

(22) Filed: Sep. 1, 2005

(65) Prior Publication Data

US 2006/0042560 A1 Mar. 2, 2006

Related U.S. Application Data

(60) Provisional application No. 60/606,760, filed on Sep. 1, 2004.

(51) Int. Cl.
*A01K 13/00* (2006.01)

(52) U.S. Cl. .................................................... 119/706

(58) Field of Classification Search ................ 119/702, 119/706, 600, 601, 165, 28.5
See application file for complete search history.

(56) References Cited

U.S. PATENT DOCUMENTS 1,905,027 A * 4/1933 Amatel ...................... 206/419
3,486,485 A * 12/1969 Kahanick .................... 119/706
3,993,027 A * 11/1976 Mullin ...................... 119/706
4,319,371 A * 3/1982 Wiederrich .................... 449/4
4,586,602 A * 5/1986 Levey .......................... 206/3
5,842,440 A * 12/1998 Bell, Jr. ..................... 119/621
6,021,741 A * 2/2000 Krietzman et al. ......... 119/706
7,011,043 B1 * 3/2006 Diep ......................... 119/601
2002/0189549 A1 * 12/2002 Writer et al. ............... 119/706

* cited by examiner

*Primary Examiner*—Teri Pham Luu
*Assistant Examiner*—Kimberly S. Smith
(74) *Attorney, Agent, or Firm*—Connolly Bove Lodge & Hutz LLP

(57) ABSTRACT

A cat scratching apparatus is disclosed. The cat scratching apparatus comprises a casing and first and second scratching surfaces. Each of the scratching surfaces is formed by superimposed edge portions of stacks of corrugated material. Further, each of the scratching surfaces is disposed within the casing such that each is opposing the other scratching surface. Additional scratching surfaces may also be added.

12 Claims, 1 Drawing Sheet

101
103′
109
103
103″
111″
111′
113′
113″
111
107
105

CAT SCRATCHING APPARATUS

PRIORITY

Priority is claimed to U.S. Provisional Application Ser. No. 60/606,760, filed Sep. 1, 2004, the disclosure of which is incorporated herein by reference.

BACKGROUND OF THE INVENTION

1. Field of the Invention

The field of the present invention is cat scratching devices.

2. Background

Domestic cats need to stretch, jump, climb and scratch in order to promote healthy body alignment, get sufficient exercise, and properly maintain their claws. In the outdoors, trees and other objects provide opportunities for these activities; however, indoor cats tend to use household furniture, carpeting, or various types of specialty cat furniture and scratching devices to fulfill these needs.

U.S. Pat. No. 3,993,027 to Mullin, the disclosure of which is incorporated herein by reference, describes a scratching post for cats which includes a stack of cardboard pieces glued together with the edges of the cardboard pieces being superimposed to provide a suitable surface on which a cat may exercise its claws. Similar scratching posts are frequently sold and used in homes to provide “safe” surfaces for cats to scratch. Such scratching posts, even though they have been around for more than twenty years, however, still have room for improvement to increase the sheer joy cats experience by digging their claws into the cardboard.

SUMMARY OF THE INVENTION

The present invention is directed toward a cat scratching apparatus. The apparatus includes at least two scratching surfaces, each formed by superimposing the edge portions of a stack of corrugated material. The scratching surfaces are either disposed at an angle adjacent one another or disposed opposite one another. Three or more scratching surfaces may be included. Preferably, each scratching surface of superimposed edge portions is planar.

Accordingly, the present invention provides an improved cat scratching apparatus. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
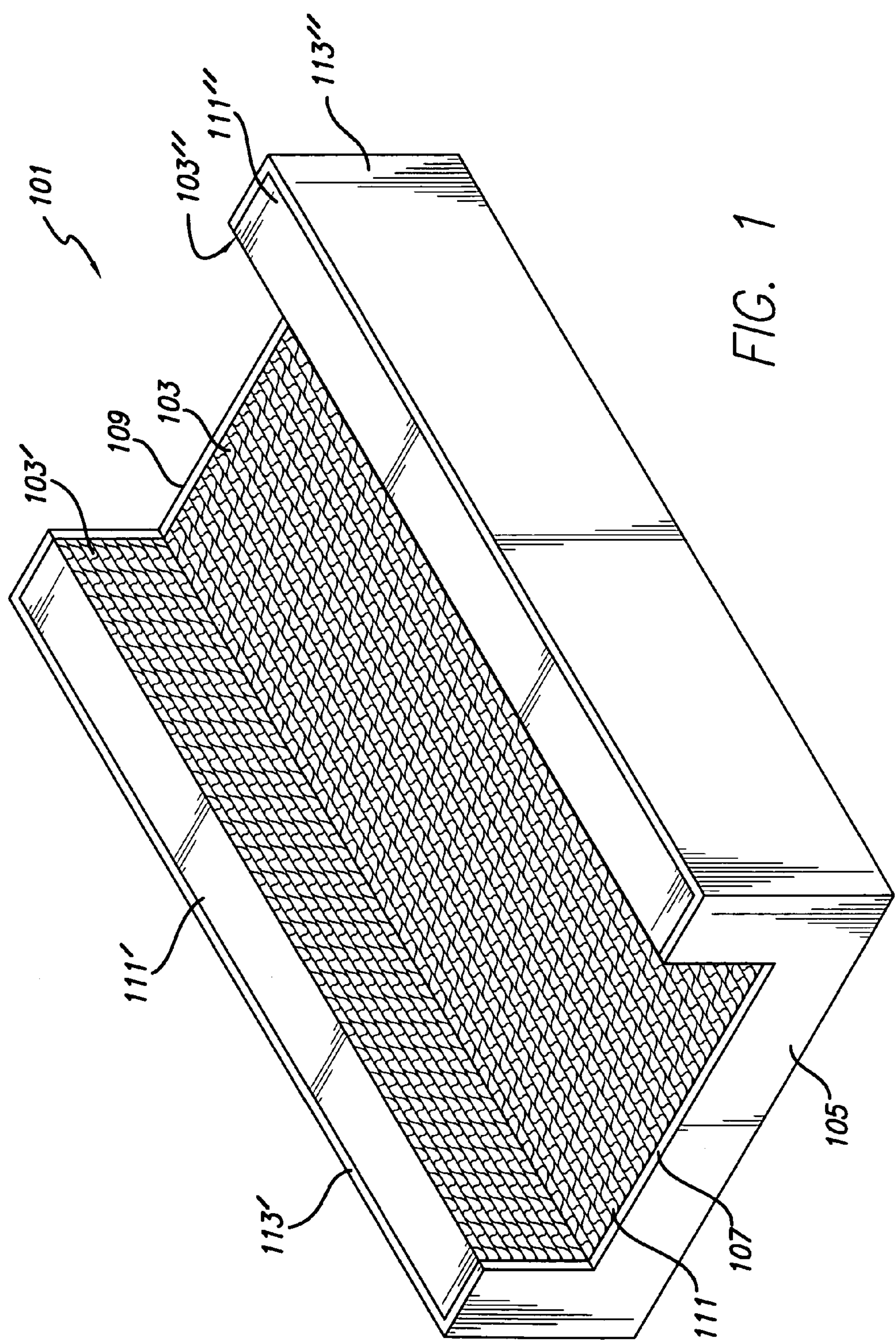
FIG. 1 illustrates a cat scratching apparatus.

Turning in detail to the drawings, FIG. 1 illustrates a cat scratching apparatus 101 having three scratching surfaces 103, 103', 103' disposed within a casing 105. The casing may be constructed out of any material that is sufficiently rigid to provide support to the scratching surfaces and will support the weight of a cat without collapsing. As shown, the casing 105 has an open structure with cut-outs 107, 109 for ingress and egress. The casing may also be constructed with a closed structure, with the scratching surfaces being disposed inside the casing and with access ports included in the casing walls to allow ingress and egress.

Each scratching surface 103, 103', 103" is formed by superimposed edge portions of a stack 111, 111', 111" of corrugated material, and each is planar, although non-planar scratching surfaces may be used. The various layers of corrugated material forming the stack may be adhered together using any appropriate method or substance to maintain alignment in the superimposed edge portions over time. The corrugated material may also be coated or impregnated with catnip or any other substance that is attractive to cats.

Each stack of corrugated material is sized to fit snugly within the casing 105 and may be secured to the walls of the casing using any appropriate method. Each stack is also fully reversible, having two sides which are useable as scratching surfaces, and replaceable by the consumer. The bottom stack 111, which forms a scratching surface oriented in the horizontal direction, is supported by the bottom portion of the casing 105. The side walls 113', 113" support and help maintain the relative position of the two stacks 111', 111", respectively, which form the scratching surfaces oriented in the vertical direction. These latter two scratching surfaces oppose one another and intersect the third scratching surface at an angle. While the angle shown is approximately 90°, the angle of intersection between any two of the scratching surfaces may be greater or less as desired.

As shown and described, the cat scratching apparatus allows a cat to freely scratch at the scratching surface in the horizontal orientation, or to press its body against one of the scratching surfaces in the vertical orientation while scratching one of the other two scratching surfaces.

Thus, a cat scratching apparatus is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A cat scratching apparatus comprising:

a casing; and first and second scratching surfaces, each formed by superimposed linear edge portions of first and second stacks of corrugated material, respectively, wherein the first and second scratching surfaces are disposed within the casing such that the scratching surfaces are disposed opposing one another.

2. The apparatus of claim 1 further comprising a third scratching surface formed by superimposed edge portions of a third stack of corrugated material, wherein the third scratching surface is disposed within the casing at an angle to the first and second scratching surfaces.

3. The apparatus of claim 2, wherein the angle is approximately 90°.

4. The apparatus of claim 1, wherein each stack of corrugated material includes two scratching surfaces.

5. The apparatus of claim 1, wherein each scratching surface is removably disposed within the casing.

6. A cat scratching apparatus comprising: a casing;

a first stack of corrugated material disposed within the casing, wherein the first stack of corrugated material includes a first scratching surface formed by superimposed linear edge portions of the corrugated material; and a second stack of corrugated material disposed within the casing, wherein the second stack of corrugated material includes a second scratching surface formed by superimposed linear edge portions of the corrugated material, the second scratching surface being disposed opposing the first scratching surface.

7. The apparatus of claim 6 further including a third stack of corrugated material disposed within the casing, wherein the third stack of corrugated material includes a third scratching surface, the third scratching surface being disposed at an angle to each of the first and second scratching surfaces.

8. The apparatus of claim 7, wherein the angle is approximately 90°.

9. The apparatus of claim 6, wherein each stack of corrugated material is removably disposed within the casing.

10. A cat scratching apparatus comprising:

a casing;

a first stack of corrugated material removably disposed within the casing, wherein the first stack of corrugated material includes a first scratching surface formed by superimposed edge portions of the corrugated material;

a second stack of corrugated material removably disposed within the casing, wherein the second stack of corrugated material includes a second scratching surface formed by superimposed edge portions of the corrugated material, the second scratching surface being disposed opposing the first scratching surface; and a third stack of corrugated material removably disposed within the casing, wherein the third stack of corrugated material includes a third scratching surface formed by superimposed edge portions of the corrugated material, the third scratching surface being disposed at an angle to each of the first and second scratching surfaces.

11. The apparatus of claim 10, wherein each stack of corrugated material is removably disposed within the casing.

12. The apparatus of claim 10, wherein the angle is approximately 90°.

* * * * *